US009168612B2

(12) United States Patent
Wilkiel et al.

(10) Patent No.: US 9,168,612 B2
(45) Date of Patent: Oct. 27, 2015

(54) LASER MATERIAL PROCESSING TOOL

(75) Inventors: Lloyd Wilkiel, Westchester, IL (US); Neal Gregory Skinner, Lewisville, TX (US); Timothy Holiman Hunter, Duncan, OK (US)

(73) Assignees: Gas Technology Institute, Des Plaines, IL (US); Halliburton Energy Services, Inc., Houston, TX (US)

( * ) Notice: Subject to any disclaimer, the term of this patent is extended or adjusted under 35 U.S.C. 154(b) by 553 days.

(21) Appl. No.: 13/015,632

(22) Filed: Jan. 28, 2011

(65) Prior Publication Data
US 2012/0195334 A1    Aug. 2, 2012

(51) Int. Cl.
E21C 37/16    (2006.01)
B23K 26/14    (2014.01)
B23K 26/06    (2014.01)
B23K 26/38    (2014.01)
E21B 7/14     (2006.01)
B23K 26/04    (2014.01)

(52) U.S. Cl.
CPC ........... *B23K 26/1476* (2013.01); *B23K 26/041* (2013.01); *B23K 26/0643* (2013.01); *B23K 26/1405* (2013.01); *B23K 26/386* (2013.01); *E21B 7/14* (2013.01)

(58) Field of Classification Search
USPC ............ 166/272.1, 302, 247; 175/16, 57, 11, 175/17, 41; 359/896; 219/121.6
See application file for complete search history.

(56) References Cited

U.S. PATENT DOCUMENTS

| | | | |
|---|---|---|---|
| 3,556,600 A | 1/1971 | Shoupp et al. | |
| 3,919,663 A | 11/1975 | Caruolo et al. | |
| 4,066,138 A | 1/1978 | Salisbury et al. | |
| 4,282,940 A | 8/1981 | Salisbury et al. | |
| 4,461,947 A | 7/1984 | Ward | |
| 4,577,324 A | 3/1986 | Nishida et al. | |
| 5,356,081 A | 10/1994 | Sellar | |
| 6,362,455 B1 | 3/2002 | Lock | |
| 6,851,488 B2 | 2/2005 | Batarseh | |
| 7,214,904 B2 | 5/2007 | Zeltner | |
| 2002/0007949 A1 * | 1/2002 | Tolman et al. | 166/280 |
| 2006/0037946 A1 | 2/2006 | Zeltner | |
| 2010/0044102 A1 * | 2/2010 | Rinzler et al. | 175/15 |

* cited by examiner

*Primary Examiner* — David Andrews
*Assistant Examiner* — Ronald Runyan
(74) *Attorney, Agent, or Firm* — Pauley Petersen & Erickson

(57) ABSTRACT

An apparatus for laser drilling including a laser beam emitter disposed within a housing having at least one laser beam outlet and at least one purge fluid outlet. At least one actuated nozzle is disposed within the housing for providing a purge fluid through the purge fluid outlet and having functional control for synchronized programmable activation patterns. Laser beam control is provided for directing a laser beam over a target surface.

27 Claims, 7 Drawing Sheets

Pressure Profile Advance

LASER MATERIAL PROCESSING TOOL

BACKGROUND OF THE INVENTION

1. Field of the Invention

This invention relates to a laser-based tool for processing materials. In one aspect, this invention relates to a laser material processing tool for use in wellbore drilling. In another aspect, this invention relates to a laser material processing tool for material cutting. In another aspect, this invention relates to a laser material processing tool for material spalling. In yet another aspect, this invention relates to a laser material processing tool for material thermal treatment, e.g. annealing. In yet another aspect, this invention relates to a laser material processing tool for material curing. In yet another aspect, this invention relates to a laser material processing tool for material surface conditioning.

2. Description of Related Art

Fluid flow into a completed subterranean wellbore is initiated by perforation of the well casing or liner. Conventionally, such perforations are created using shaped charges for establishing flow of oil or gas from the geologic formations into the wellbore. This generally creates tapered, uneven shaped openings of relatively small diameter, i.e. less than about 1 inch. In addition, the perforations typically extend only a few inches into the formation. In addition to the limitations of opening size and hole depth, there are numerous problems with this approach. First, the melt or debris from shaped charges usually reduces the permeability of the producing formations resulting in a substantial reduction in production rate. Second, these techniques involve the transportation and handling of high power explosives and are causes of serious safety and security concerns. Third, the energy jet into the formation also produces fine grains that can plug the pore throat, thereby reducing the production rate. Water jetting can also be used for wellbore perforation; however, the opening that is created is generally not very uniform.

Additionally, other steps for initiating fluid flow may also be required, depending, at least in part, on the physical properties of the fluid in question and the characteristics of the rock formation surrounding the well. Fluid flow may be inhibited in situations involving highly viscous fluids and/or low permeability formations. Highly viscous fluids do not flow easily. As a result of the decreased rate of flow, efficiency is lowered and overall production rate decreases. The same is true for low permeability formations. In extreme cases, these factors reduce the flow rate to zero, halting production entirely.

The use of lasers for the purpose of producing boreholes to enable the extraction of liquid and gaseous fuels from underground formations is well-known in the art. U.S. Pat. No. 4,066,138 to Salisbury et al. teaches an earth boring apparatus mounted above ground that directs an annulus of high powered laser energy downwardly for boring a cylindrical hole by fusing successive annular regions of the stratum to be penetrated at a power level that shatters and self-ejects successive cores from the hole.

U.S. Pat. No. 4,282,940 to Salisbury et al. teaches a method for perforating oil and gas wells. Using this method, a high-powered coherent light beam is axially directed along the borehole to a predetermined depth and deflected along a beam axis. The beam is focused to concentrate at each of a plurality of spaced focal points along the deflected beam. This, in turn, is said to provide a significant increase in the distance that calculated oil or gas bearing formations can be perforated, thereby increasing the yield by more conventional means.

With known laser-based devices for wellbore perforation, perforation depths have been limited to about 4 inches after which further penetration is hampered by hole taper issues and the lack of efficient debris removal. Hole taper occurs when a collimated laser beam is utilized because of the Gaussian beam shape distribution and attenuation of the laser beam with the debris column in the hole. The edges of the beam contain less irradiance than the center of the beam as a result of which, as the perforation gets deeper, the hole eventually comes to a point and the laser beam can no longer penetrate. In addition, once begun, hole tapering is difficult to correct with a laser processing beam oriented parallel to the perforation axis due to the increased surface area presented by the side walls. Furthermore, reflections from grazing angle incidence tend to reflect laser energy into the central regions of the opening/perforation, creating excessive heating in the center, causing uneven material removal, opening shapes, and opening quality. In rock/refractory applications, the central material could glassify before the sidewall material is spalled, thereby creating poor quality openings and reducing the efficiency of material removal.

Drill lasers emit short, high-frequency light pulses for creating boreholes. The high amount of local energy that is generated is used to remove the material or produced in the borehole due to abrupt vaporization while the molten phase is avoided. However, with conventional drill lasers, there is also the possibility that melt residue or slag deposits on the edge of the borehole. Such melt or slag residue deposits are undesirable because they can significantly influence the borehole quality.

SUMMARY OF THE INVENTION

It is one object of this invention to provide a laser-based material processing tool which reduces the possibility of melt or slag residue deposits on the edges of boreholes.

It is another object of this invention to provide a laser-based material processing tool which is able to produce a substantially deeper borehole having substantially less taper than conventional laser material processing tools.

These and other objects of this invention are addressed by a laser material processing tool comprising at least one laser or other optical emitter in conjunction with opto-mechanical elements to direct or scan the generated optical energy in conjunction with one or more automated purge fluid jet streams. More particularly, the laser material processing tool of this invention comprises a laser head assembly comprising a housing having at least one laser energy outlet and at least one purge fluid outlet, at least one optical emitter suitable for emitting laser energy disposed within the housing, laser energy control means for directing or scanning the laser energy over a target surface, at least one automated purge fluid emitter adapted to emit a gaseous and/or liquid purge fluid through the at least one purge fluid outlet, and synchronization means for synchronizing emissions of the laser energy and purge fluid. The tool is suitable for use in laser material processing applications including, but not limited to, cutting, drilling, spalling, thermal treating, curing, and surface conditioning. Operational features of the tool include dross control along laser cutting tool paths, creation of circulating purge jets to improve debris removal, improved optics protection, and wider fluid jet coverage with overlapping fluid jets, in addition to simulation fluid jets coaxial to the axis of the laser beam propagation. In addition, greater fluid medium choices are enabled because the fluid jets do not necessarily cross or co-propagate along the laser beam path.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Without intending to limit the material processing applications of this invention, the laser material processing tool of this invention is primarily intended for the processing of materials within a wellbore. In addition to being able to operate generally in the harsh downhole environment, the laser material processing tool is able to generate substantially uniform, taper-controlled holes, including holes having minimal taper, in downhole materials for wellbore perforation and perform other downhole activities requiring material processing. In general, the tool comprises two primary components for material processing—a laser beam emitter for heating the material to be processed and a gaseous and/or liquid purge fluid emitter for facilitating the removal of material from the material opening created by the laser beam.

Figure 1:
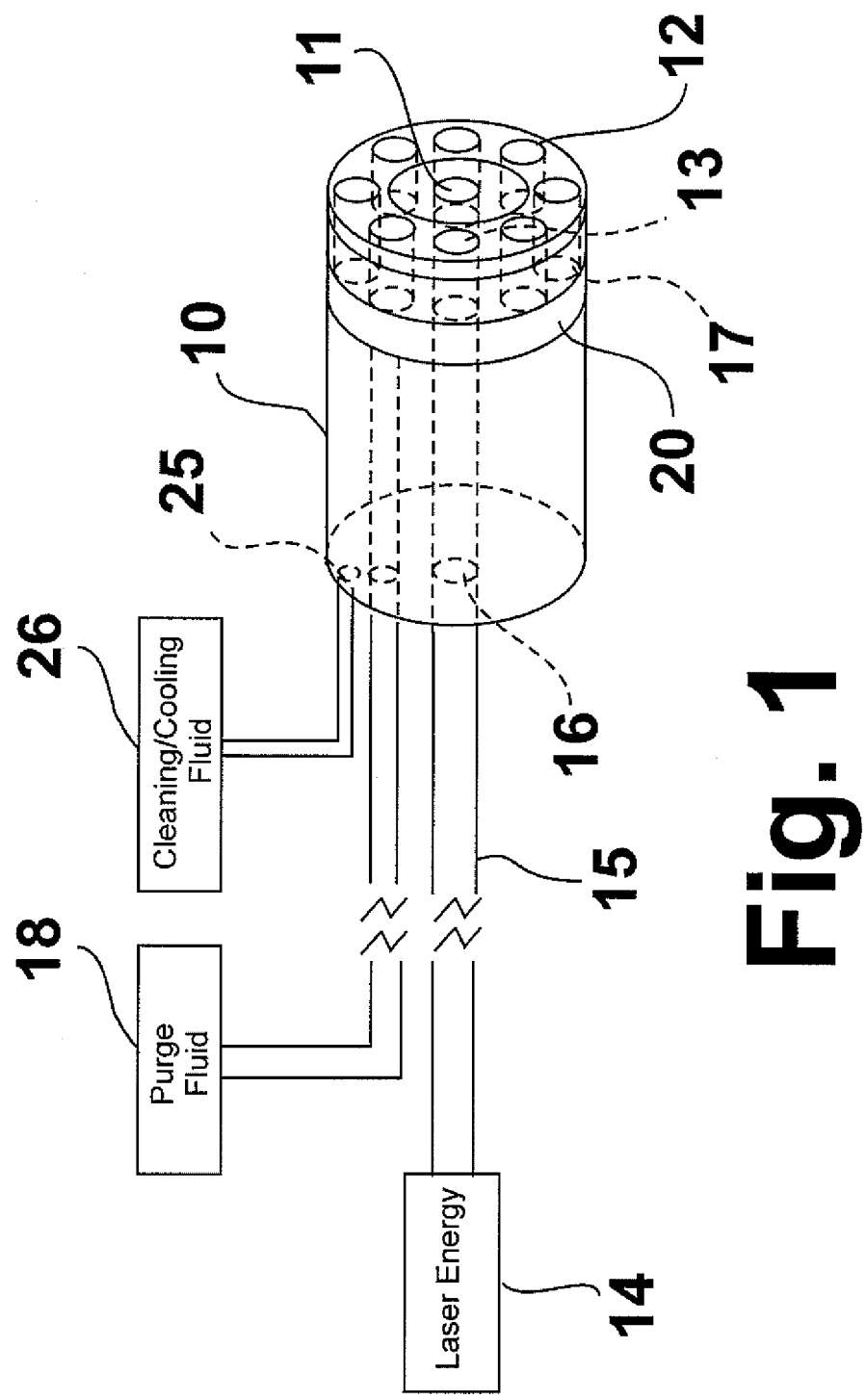
FIG. 1 is a schematic diagram of a laser material processing tool having a laser with a programmable purge fluid jet array for cutting deep cylindrical holes.

FIG. 1 shows a laser material processing tool in accordance with one embodiment of this invention. As shown therein, the tool comprises a laser head assembly comprising a housing 10 having at least one laser energy outlet 11 and at least one purge fluid outlet 12. At least one optical emitter 13 is disposed within the housing and connected with a laser energy source 14 which, in the case of downhole activities, is preferably disposed above ground. Laser energy communication between the laser energy source and the optical emitter is provided by at least one optical fiber or optical fiber bundle 15 extending into the housing through a laser energy inlet 16. Disposed within the housing is one purge fluid emitter, e.g. nozzle 17, for each purge fluid outlet 12 in fluid communication with a purge fluid source 18 external to the housing. In accordance with one embodiment of this invention, each purge fluid emitter is oriented in a fixed direction. In accordance with one embodiment of this invention, the purge fluid emitters are actuated nozzles having functional control for synchronized individual or group programmable activation patterns created by pressure, purge fluid flow, and/or directionality control or regulation. In accordance with one embodiment, purge fluid is provided to each purge gas nozzle by way of a distribution plenum or chamber 20 disposed within the housing. It will be appreciated that other means for providing purge fluid to the nozzles, such as the use of individual supply lines providing fluid communication between purge fluid source 18 and each nozzle 17, may be employed and such alternative means are deemed to be within the scope of this invention. In accordance with one embodiment of this invention, housing 10 forms at least one fluid inlet 25 in fluid communication with a cleaning and/or cooling fluid source 26 from which a cleaning and/or cooling fluid is provided to the housing interior.

In accordance with one embodiment of this invention, a plurality of purge fluid outlets through which purge fluid are emitted in a user-defined programmable sequence are concentrically disposed around the laser energy outlet (FIG. 2), thereby providing user selectable purge fluid jet delivery angles at each point along a sweep pattern on a target, allowing not only flexibility in timing correlations between the laser energy and purge fluid application, but also custom shaping of fluid pressure wave fronts, multiple angles of attack, rapid pulsing of the purge fluid and fewer design constraints on the fluid nozzles, i.e. orifice size, geometry and materials of construction, since they need not accommodate the laser energy or beam.

Figure 2:
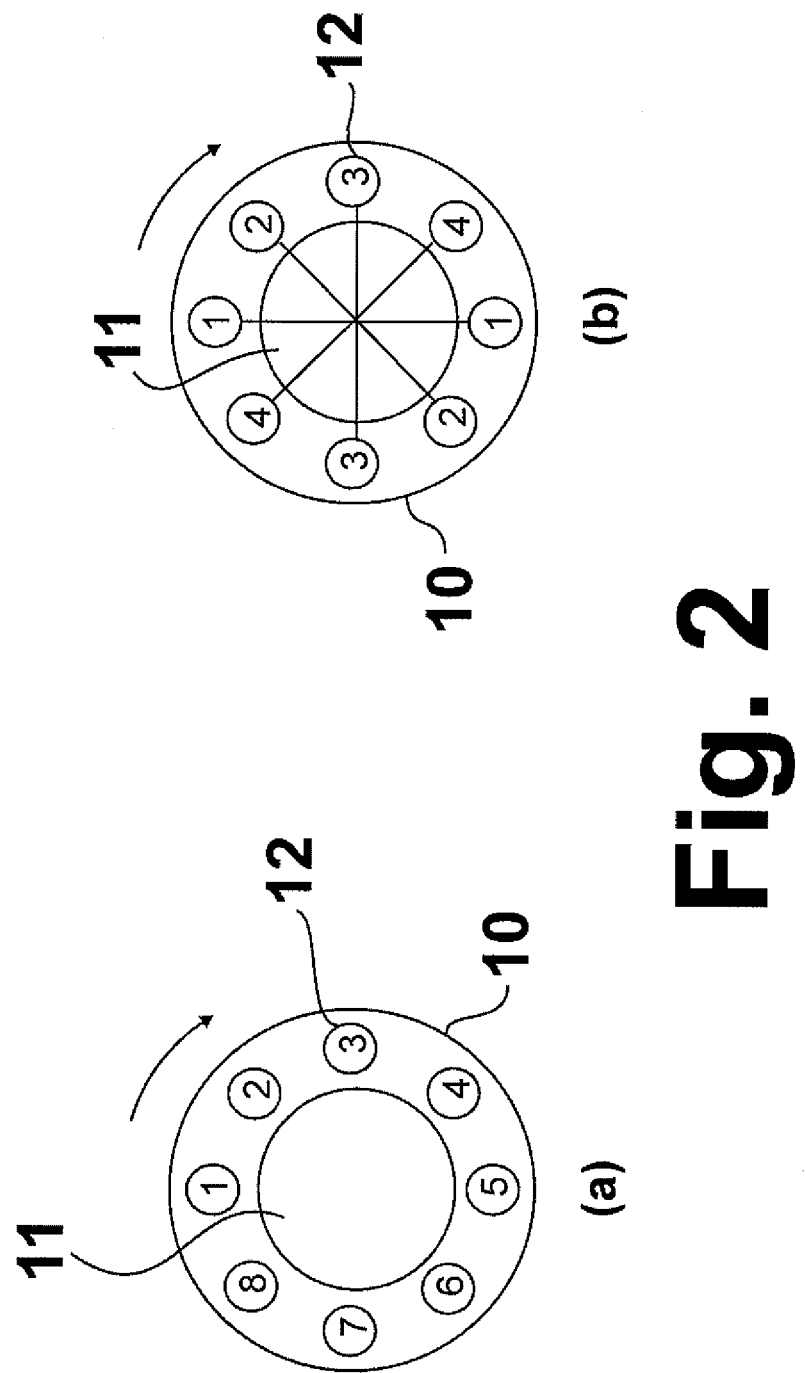
FIG. 2 is a diagram showing certain programming options for the programmable purge fluid jet array in accordance with certain embodiments of this invention.
Figure 3:
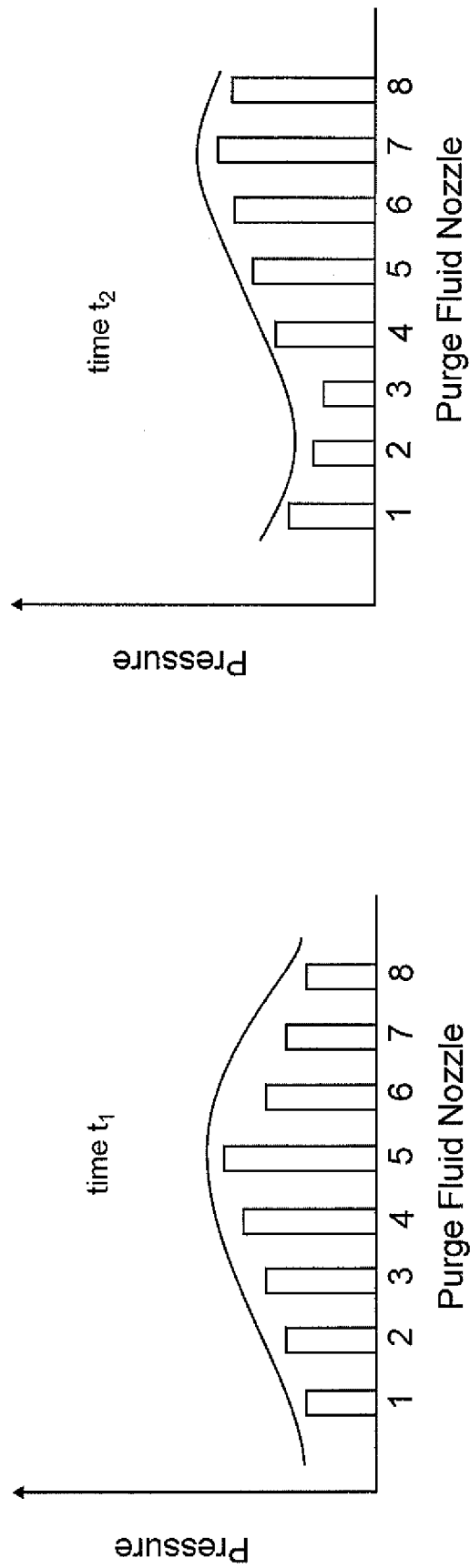
FIG. 3 is a diagram showing a programming option for the programmable purge fluid jet array producing a wave effect.

FIG. 2 illustrates two possible programmable sequences for activation of the purge fluid nozzles. In FIG. 2(a), the nozzles are continuously sequentially (1→8) activated, producing a cyclone effect. In FIG. 2(b), the purge fluid nozzles are activated in opposing pairs in a circulating pattern. The creation of a wave effect by pressure modulation across the array of purge fluid nozzles is illustrated in FIG. 3. A burst effect may be created by simultaneous pulsing of the laser beam and purge fluid array.

Figure 4:
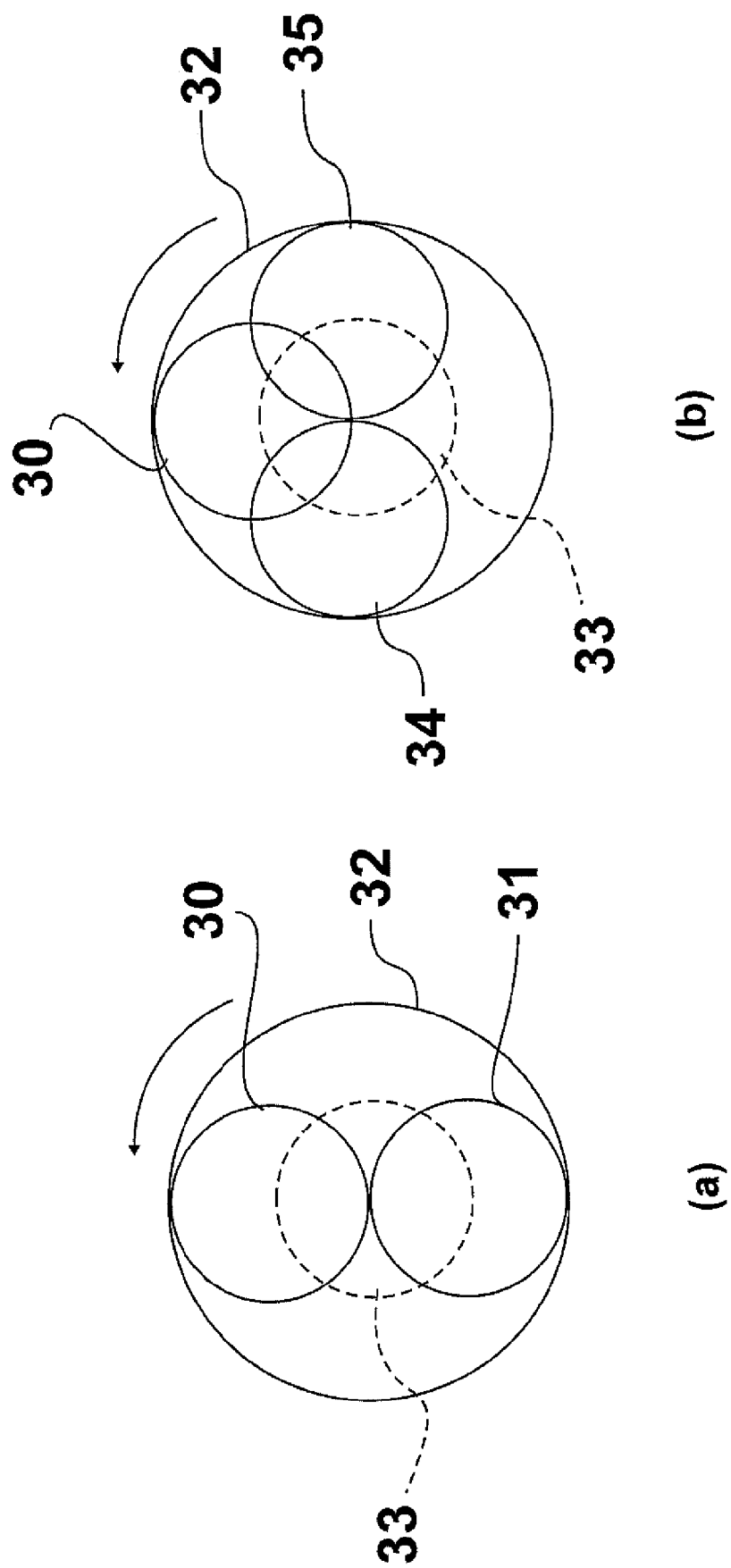
FIG. 4 is a schematic diagram of a scanning pattern produced by a laser/fluid purge dual scan cutting tool in accordance with one embodiment of this invention.

In accordance with one embodiment of this invention, the laser material processing tool comprises a single laser emitter and a single purge fluid emitter which are scanned in tandem to produce the laser beam 30 and purge fluid jet 31 scanning pattern shown in FIG. 4(a). As shown therein, the laser beam and purge fluid jet traverse the inner boundary of a cut circle 32 in a circular orbit 33 (without rotating about their own centers). The benefits of this embodiment include the ability to cut a hole having a diameter greater than the laser beam diameter; the ability to cut a uniform, controlled-taper hole while maintaining time averaged irradiance and pressure substantially constant; a reduced chance of clipping or shadowing the laser beam with the purge fluid emitter; no impingement on the laser beam by the purge fluid jets as the purge fluid jets advance, i.e. telescope, into the opening since the laser beam and the purge fluid jet do not occupy the same volume simultaneously; and adaptability to different substrate materials with easily scanning parameters such as rate of revolution, phase angle/clock position of laser vs. purge fluid jet, ratio of clock cycles of laser beam and purge fluid jet (for more laser resistant materials, the laser beam could do a plurality of revolutions before the purge fluid jet is turned on).

In accordance with one embodiment of this invention, the laser material processing tool comprises two purge fluid emitters, thereby enabling the providing of a purge fluid jet ahead of and behind the laser beam, as shown in FIG. 4(b). In this embodiment, a leading purge fluid jet 34 clears a path for the laser beam 30 and a trailing purge fluid jet 35 purges (removes) weakened material from the target area.

Figure 5:
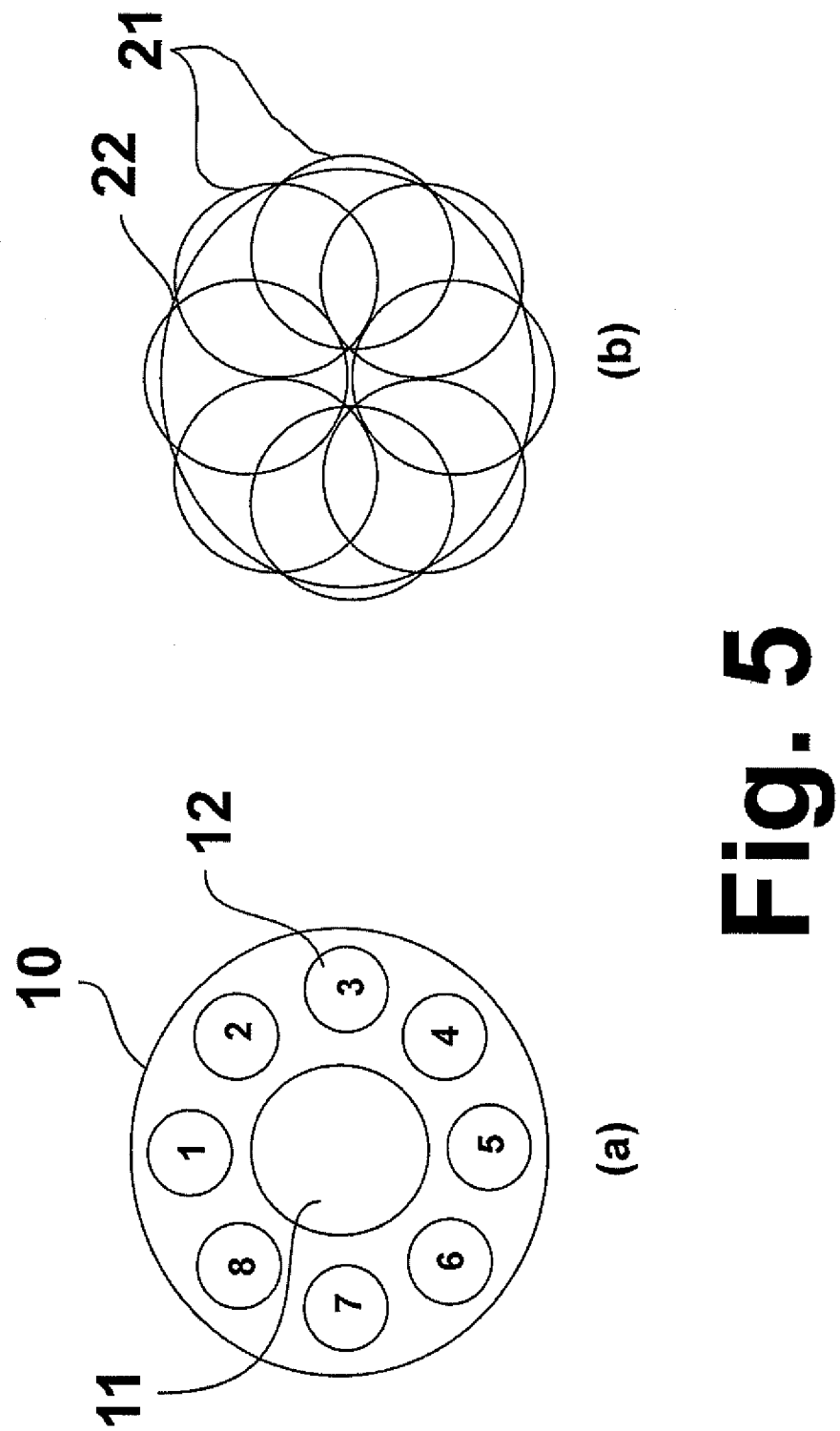
FIG. 5 is a schematic diagram of a scanning optical emitter in accordance with one embodiment of this invention.

FIG. 5(a) shows the arrangement of a purge fluid array having purge fluid outlets 12 disposed around a laser beam emitter 11 in accordance with one embodiment of this invention and FIG. 5(b) shows the zones 21 of purge fluid coverage overlaying the laser scan area 22 attainable with this arrangement.

Figure 6:
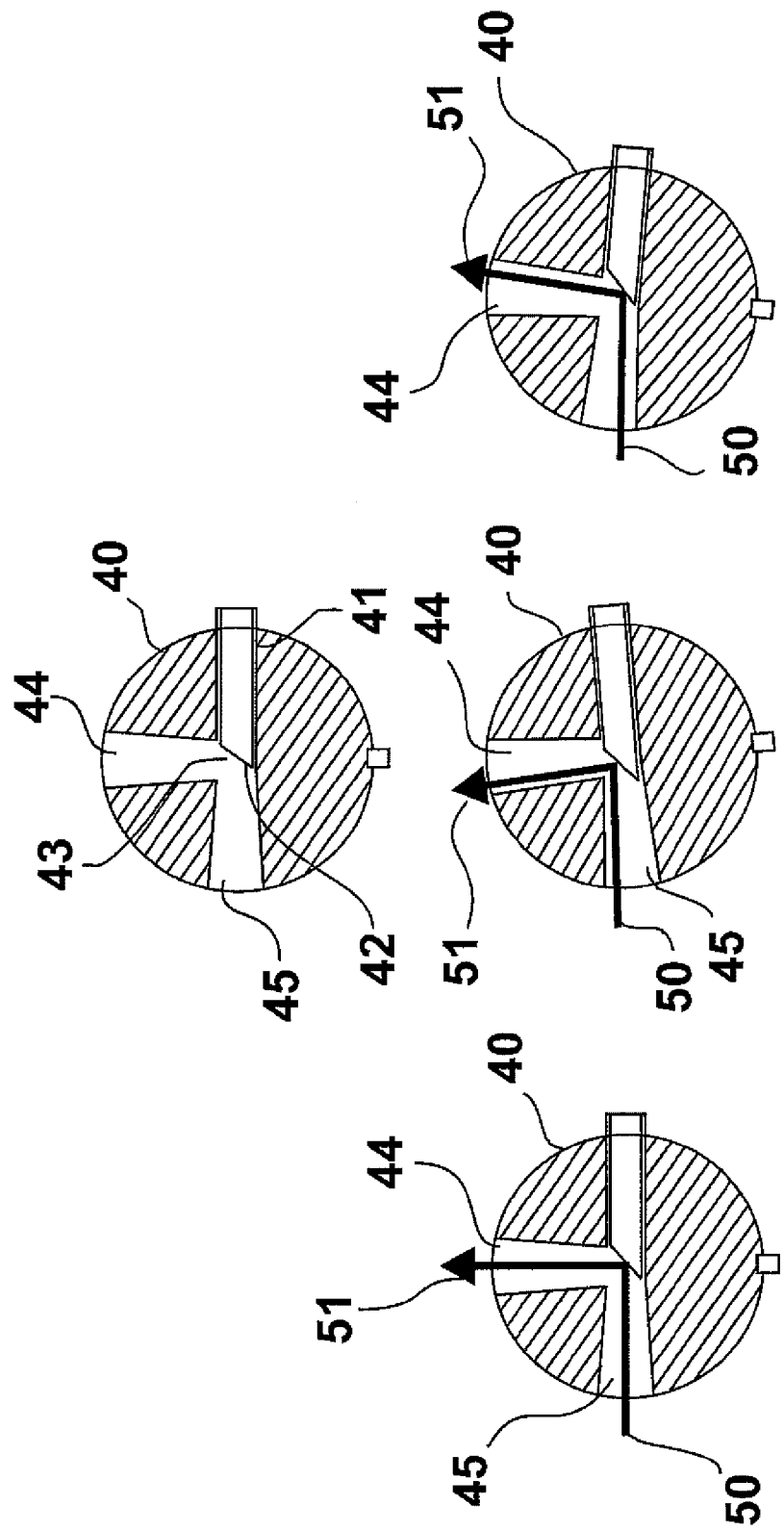
FIG. 6 is a diagram showing a scanning pattern produced by the laser material processing tool shown in FIG. 1.

FIG. 6 is a diagram showing a laser beam emitter in accordance with one embodiment of this invention for scanning a laser beam over a target area. The laser beam emitter comprises a substantially solid sphere 40 having at least one channel 41 for affixing a mirror 42 in a cavity 43 proximate the axis of the sphere and having two channels 44, 45 extending from the cavity to the surface of the sphere through which a laser beam, indicated by arrow 50, is directed onto the surface of the mirror and the reflected beam 51 is directed out of the sphere onto a target area. In accordance with one preferred embodiment of this invention, the channels 44, 45 are diverging channels, thereby enabling the reflected laser beam to be directed at a variable angle to the incident (incoming) laser beam onto the target area. The mirror may be made from a wide range of materials including metals and ceramics and is coated with a coating selected to maximize the reflection of the incidence laser beam. The mirror surface may be flat, convex, or concave to achieve a desired beam shape. For example, a collimated beam may retain its profile, become divergent, and become convergent by using flat, convex, and concave surfaces, respectively. The sphere may be rotated around two axis, which are preferably perpendicular to each other, to provide trepanning motion of the laser beam on the target area.

It will be appreciated by those skilled in the art that, while circular purge fluid nozzles are preferred, non-circular purge fluid nozzles may be employed in accordance with one embodiment of this invention. In accordance with one embodiment of this invention, the laser material processing tool comprises directional control means for controlling the laser beam scan path. In accordance with one embodiment, the control means comprises gimbal mounts and inputted programmed laser beam scan paths to optimize automated purge fluid jet throttling and firing sequences.

Figure 7:
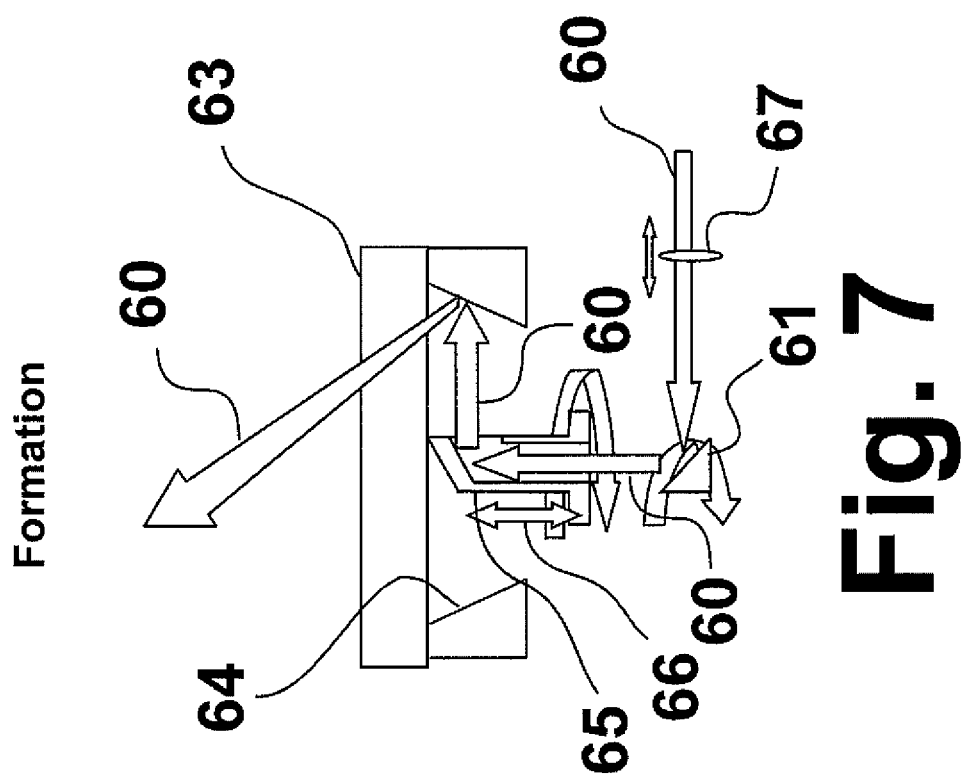
FIG. 7 is a schematic diagram of a scanning optical emitter for creating openings in solids in accordance with one embodiment of this invention.

In accordance with another embodiment of this invention for manipulating or controlling the laser beam as shown in FIG. 7, a laser beam or input beam 60 ostensibly parallel to the tool axis is reflected from a "fixed" mirror 61 toward the OD of the tool and the formation. Next, the laser beam is reflected from a rotating mirror 65 which redirects the laser beam approximately 90° after which the laser beam is reflected from a concave, conical or bowl-shaped mirror 64 and exits the tool through a transparent window 63. As shown in FIG. 7, the rotating mirror 65 can translate up and down, as indicated by arrows 66, in order to cause the laser beam to reflect from different locations along the bowl-shaped mirror 64. The local radius of curvature on the inside of the bowl-shaped mirror may be variable so that the exit angle and the size of the laser beam or its focus may be altered. Additional laser beam adjustments may be made by changing the angle of the "fixed" minor or the angle of the reflective surface of the rotating mirror. The window preferably is provided with anti-reflection coatings to minimize the loss of optical power due to transmission through the window. In accordance with one embodiment of this invention as shown in the bottom, right side of FIG. 7, a movable lens 67 may be used to change the focus of the laser beam 60. Preferably, metallic mirrors should be used due to their inherent high reflectivity, resistance to shock and vibration, and good thermal conductivity. In accordance with one embodiment of this invention, fluid passages are provided through the mirrors to aid in cooling of the mirrors. In accordance with another embodiment of this invention, high reflectivity dielectric or dielectric coated mirrors may be used. However, these mirrors may be more subject to damage from downhole shock and vibrations and more difficult to cool then metallic mirrors.

In accordance with one embodiment of this invention, a fluid, such as nitrogen, air, water, KCl solution or other fluid type that is substantially transmissive to laser energy is introduced directly into the housing to sweep the optics or through channels surrounding the optics, to cool the optics and prevent the build-up of debris on the optics or in the optics channels.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A laser material processing tool for processing material within a wellbore, the laser material processing tool comprising:
   a laser head assembly comprising a housing having at least one laser energy outlet and a plurality of purge fluid outlets concentrically disposed around said at least one laser energy outlet;
   at least one optical emitter suitable for emitting laser energy disposed within said housing;
   laser energy control means for directing said laser energy over a target surface;
   at least one automated purge fluid emitter adapted to emit a purge fluid through at least one of said plurality of purge fluid outlets; and
   synchronization means for synchronizing cyclic sequential emissions of said laser energy and said purge fluid directed at said target surface, said synchronization means comprises activation program for activating purge fluid flow through said purge fluid outlets in a user-defined programmable sequence,
   wherein said sequential emission of laser energy from said at least one optical emitter and emission of purge fluid from said plurality of purge fluid outlets comprises a laser beam is followed by a purge fluid jet which removes material weakened by the laser beam from the target surface to form a hole at the target surface.

2. The laser material processing tool of claim 1, wherein each of said purge fluid outlets is oriented in a fixed direction.

3. The laser material processing tool of claim 1, wherein said optical emitter comprises a first mirror aligned to reflect said laser energy received from a laser energy source, a rotating mirror aligned to receive said laser energy reflected from said first mirror, and an annular mirror aligned to receive said laser energy reflected from said rotating mirror and reflect said laser energy on to said target surface.

4. The laser material processing tool of claim 3, wherein said annular mirror has a shape selected from the group consisting of concave, conical and bowl-shaped.

5. The laser material processing tool of claim 4, wherein a local radius of curvature on said bowl-shaped mirror is variable.

6. The laser material processing tool of claim 3 further comprising a transparent window having an antireflection coating covering said laser energy outlet.

7. The laser material processing tool of claim 3 further comprising a movable focal lens for changing a focus of said laser energy disposed in a laser energy path between said first mirror and said laser energy source.

8. The laser material processing tool of claim 3, wherein said mirrors are metallic mirrors.

9. The laser material processing tool of claim 1, wherein said housing forms a fluid inlet for receiving at least one of a cleaning fluid and a cooling fluid into said housing in fluid communication with at least one of a cleaning fluid source and a cooling fluid source.

10. The laser material processing tool of claim 1, wherein said optical emitter comprises a solid sphere having a centrally disposed cavity, a mirror disposed within said cavity, and two channels extending from said cavity to a surface of said sphere, whereby laser energy entering said cavity through one of said channels is reflected off said mirror, exiting said cavity through the other said channel.

11. The laser material processing tool of claim 10, wherein said channels are diverging channels.

12. A subterranean wellbore perforation tool comprising the laser material processing tool of claim 1 wherein said laser head assembly is adapted to be disposed within a subterranean wellbore and wherein emission of purge fluid from said at least one purge fluid outlet and emission of laser energy from said at least one optical emitter are directed at a subterranean wellbore casing.

13. The laser material processing tool of claim 1, wherein said sequential emission of laser energy from said at least one optical emitter and emission of purge fluid from said plurality of purge fluid outlets comprises a leading purge fluid jet to clear a path for a laser beam and the laser beam is followed by a trailing purge fluid jet to remove material weakened by the laser beam from the target surface.

14. An apparatus for subterranean laser drilling comprising:
a laser beam emitter disposed within a housing having at least one laser beam outlet for emitting laser energy, and at least one purge fluid outlet;
at least one actuated nozzle disposed within said housing for emitting a purge fluid through said at least one purge fluid outlet and having functional control for synchronized programmable activation patterns; and
laser beam control means for directing a laser beam over a target surface,
wherein emission of laser energy from said at least one optical emitter and emission of purge fluid from said at least one purge fluid outlet are directed at said target surface and wherein a leading purge fluid jet clears a path for a laser beam and the laser beam is followed by a trailing purge fluid jet which removes material weakened by the laser beam from the target surface.

15. The apparatus of claim 14, wherein said housing comprises a plurality of said purge fluid outlets concentrically disposed around said at least one laser beam outlet.

16. The apparatus of claim 15, wherein a plurality of said actuated nozzles are disposed in said housing, one of said actuated nozzles for each said purge fluid outlet.

17. The apparatus of claim 16, wherein each of said actuated nozzles is oriented in a fixed direction.

18. The apparatus of claim 14, wherein said laser beam emitter comprises at least one optical fiber.

19. The apparatus of claim 14, wherein said laser beam emitter comprises a first mirror aligned to reflect said laser beam, a rotating mirror aligned to receive said laser beam reflected from said first mirror, an annular mirror aligned to receive said laser beam reflected from said rotating mirror and reflect said laser beam onto said target surface, and a transparent window having an antireflection coating covering said laser beam outlet.

20. The apparatus of claim 19, wherein said annular mirror is bowl-shaped.

21. The apparatus of claim 20, wherein a local radius of curvature of said bowl-shaped mirror is variable.

22. The apparatus of claim 19 further comprising a movable focal lens for changing a focus of said laser beam disposed in a laser beam path between said first mirror and a laser beam source.

23. The apparatus of claim 14, wherein said laser beam emitter comprises a solid sphere having a centrally disposed cavity, a mirror disposed within said centrally disposed cavity, and two channels extending from said centrally disposed cavity to a surface of said solid sphere, whereby said laser beam entering said cavity through one of said channels is reflected off said mirror, exiting said cavity through the other said channel.

24. The apparatus of claim 23, wherein said channels are diverging channels.

25. The apparatus of claim 14, wherein said housing forms a fluid inlet for receiving at least one of a cleaning fluid and a cooling fluid into said housing in fluid communication with at least one of a cleaning fluid source and a cooling fluid source.

26. An apparatus for subterranean wellbore perforation comprising the apparatus of claim 14, wherein emission of the purge fluid from said at least one purge fluid outlet and emission of laser energy from said at least one optical emitter are directed at a subterranean wellbore casing.

27. A laser material processing tool for processing material within a wellbore, the laser material processing tool comprising:
a laser head assembly comprising a housing having at least one laser energy outlet and at least one purge fluid outlet;
at least one optical emitter suitable for emitting laser energy disposed within said housing;
laser energy control means for directing said laser energy over a target surface;
at least one automated purge fluid emitter adapted to emit a purge fluid through said at least one purge fluid outlet; and
synchronization means for synchronizing cyclic sequential emissions of said laser energy and said purge fluid directed at said target surface,
wherein said sequential emissions of laser energy from said at least one optical emitter and emission of purge fluid from said at least one purge fluid outlet comprise a leading purge fluid jet to clear a path for a laser beam and the laser beam is followed by a trailing purge fluid jet to remove material weakened by the laser beam from the target surface.

* * * * *